United States Patent [19]

Saito

[11] Patent Number: 4,757,212

[45] Date of Patent: Jul. 12, 1988

[54] POWER SOURCE DEVICE

[75] Inventor: Takao Saito, Nagoya, Japan

[73] Assignee: Toyota Jidosha Kabushiki Kaisha, Toyota, Japan

[21] Appl. No.: 929,478

[22] Filed: Nov. 12, 1986

[30] Foreign Application Priority Data

Nov. 14, 1985 [JP] Japan .................... 60-256233

[51] Int. Cl.$^4$ ............................. H04Q 9/00
[52] U.S. Cl. ................... 307/10 R; 180/78
[58] Field of Search ............ 307/10 R, 150; 180/78, 180/79, 80

[56] References Cited

U.S. PATENT DOCUMENTS

| 4,438,425 | 3/1984 | Tsuchida et al. | 307/10 R |
| 4,456,903 | 6/1984 | Kishi et al. | 307/10 R |
| 4,471,230 | 9/1984 | Yamamoto | 307/10 R |
| 4,616,224 | 10/1986 | Reighard | 307/10 R |
| 4,635,029 | 1/1987 | Yamada | 307/10 R |

Primary Examiner—Bernard Roskoski
Attorney, Agent, or Firm—Cushman, Darby & Cushman

[57] ABSTRACT

A power source device for supplying driving power from a main power source disposed on a first region to an electric circuit disposed on a second region movable relative to the first region, includes an energy transmitting device provided on the first region, for wirelessly transmitting energy to the second region. An energy receiving device is provided on the second region, for receiving the energy and converting the received energy into source power for use by the electric circuit. Thus, the source power is supplied non-contact from the first region to the second region, both regions being movable relative to each other. As a consequence, the source power for driving an electric circuit can be wirelessly supplied from the first region to the electric circuit provided on the second region without using a wire harness, a slip ring or the like.

4 Claims, 2 Drawing Sheets

POWER SOURCE DEVICE

BACKGROUND OF THE INVENTION

1. Field of the Invention

This invention relates to a power source device, and more particularly to improvements in a device wherein source power is supplied from one region to another, which regions are movable relative to each other.

2. Description of the Prior Art

When, in two regions which are movable relative to each other, a main power source is provided on one of the regions and only one electric circuit is provided in the other of the regions, a problem is presented as to how source power is supplied from one of the regions, where the main power source is provided, to the electric circuit provided in the other of the regions.

Particularly, in the field of motor vehicles, as typified by a steering switch, a lever combination switch and the like for example, electric circuits are often provided on a movable section of the vehicle. In such cases, there is presented the problem as to how to supply the source power to the electric circuit provided on the movable section from a battery power source.

Because of this, in the conventional power source device for a steering switch, a slipring is provided between a column and a steering switch and the source power is supplied through this slip ring.

Furthermore, in the conventional power source device for a lever combination switch provided on a movable section such as a tilt handle or a telescopic handle, the sides of a column and a handle are connected to each other through a wire harness and the source power is supplied through this wire harness.

However, when the slip ring is used for the power supply to the movable section as described above, problems are presented in that it is unavoidable that the cost of the device as a whole is raised, and further, the workability in assembling is low because the movable section and the stationary section cannot be completely separated from each other.

Furthermore, in the device wherein the wire harness is used for the power supply to the movable section, there is presented the problem that the workability in assembling is low as described above, and moreover, problems are presented in that, when the lever combination switch is provided on the tilt handle, the telescopic handle or the like, in order to adjust the wire harness itself to the aforesaid tilt or telescopic handle, it becomes necessary to form the wire harness into take-up reel type one, whereby the device as a whole becomes further expensive and large-sized, and moreover, the device as a whole lacks reliability because the wire harness is unwound from or wound into the reel.

SUMMARY OF THE INVENTION

The present invention has been developed to obviate the above-described problems of the prior art and has as its object the provision of a power source device, wherein the source power is supplied in, non-contact from a first region, where a main power source is provided, to an electric circuit provided on a second region movable relative to the first region, without using the slip ring, the wire harness or the like as described above.

To achieve the above-described object, the present invention contemplates a power source device, for supplying a driving power from the first region, where the main power source is provided, to the electric circuit provided on the second region movable relative to this first region, which includes an energy supply section provided on the first region and an energy receiving section provided on the second region, being the source power is supplied non-contact from the one region to the other, the both regions being movable relative to each other.

In the power source device according to the present invention, energy is wirelessly supplied from the first region, where the main power source is provided, to the second region movable relative to the first region, whereby the source power is supplied in non-contact to the electric circuit provided on the second region.

As described above, according to the present invention, one of the regions, which are movable relative to each other, is provided thereon with an energy supply section and the other is provided thereon with an energy receiving section, whereby the source power can be supplied non-contact from the first region to the second region. Accordingly, when the source power is supplied from a battery power source to an electric circuit provided on a movable section of a motor vehicle, such as, for example, as a steering switch, a lever combination switch or the like, it is not necessary to use a slip ring or a wire harness as in the past, therefore, the reliability of the device as a whole is raised, the device itself is rendered compact and inexpensive, and moreover, the workability in assembling the movable section, where the steering switch or the lever combination switch is provided, to a stationary section can be improved.

BRIEF DESCRIPTION OF THE DRAWINGS

The exact nature of this invention, as well as other objects and advantages, will be readily apparent from consideration of the following specification relating to the accompanying drawings, in which like reference characters designate the same or similar parts throughout the figures thereof and wherein.

DETAILED DESCRIPTION OF THE INVENTION

The preferred embodiment of the present invention will hereunder be described with reference to the accompanying drawings.

Figure 1:
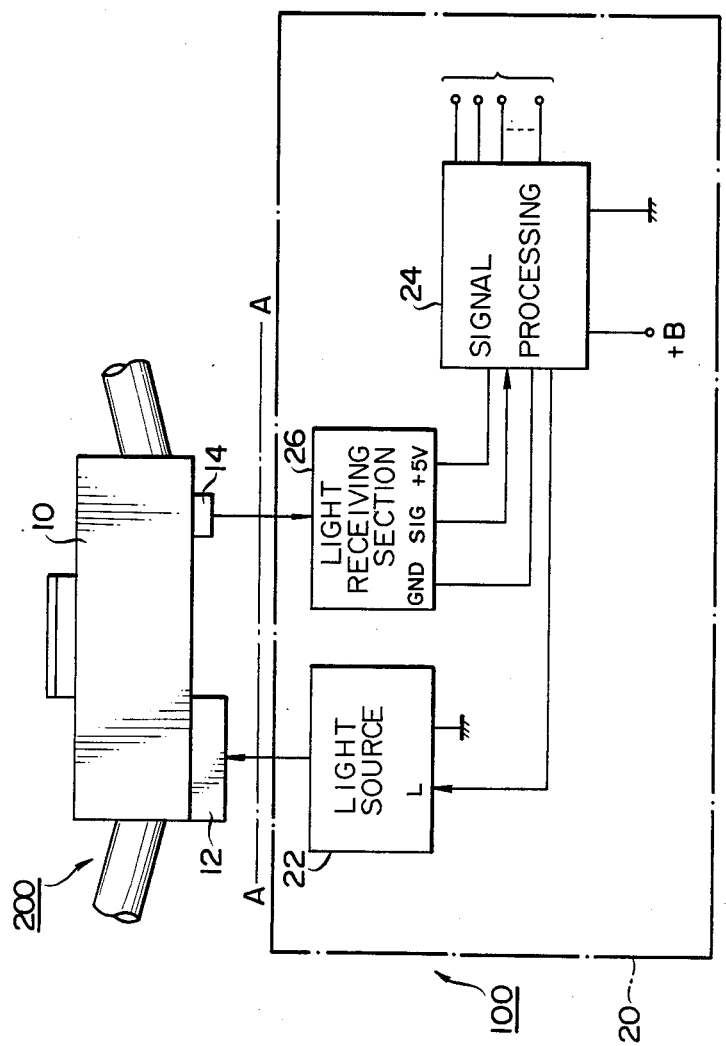
FIG. 1 is a block diagram showing a preferred embodiment of the power source device according to the present invention.

FIG. 1 shows the preferred embodiment of the power source device according to the present invention. In this embodiment, the power source device supplies the source power from a stationary section 100 of a motor vehicle to an electric circuit provided on a movable section 200 of the motor vehicle.

Here, the movable section 200 is movable relative to the stationary section 100 on the boundary A—A. Such movable sections as 200 are present at various portions of a motor vehicle. In this embodiment, description will be given by exemplifying the case, where, as an electric circuit provided on the movable section 200, a lever combination switch 10 is provided on a tilt handle or a telescopic handle, the power for driving this lever combination switch is supplied from the side of the stationary section 100 to the side of the movable section 200.

The characteristic feature of the present invention resides in that the energy as the power for driving the lever combination switch 10 is wirelessly supplied to an electric circuit such for example as the lever combination switch 10, which is provided on the movable section 200 from an electric circuit 20 provided on the stationary section 100.

For this, in this embodiment, a light source 22 is provided on the side of the stationary section 100 as the energy supply section for wirelessly supplying light energy to the movable section 200, and a solar battery 12 is provided on the side of the movable section 200 as the energy receiving section for receiving the light energy thus wirelessly supplied. The solar battery 12 converts the received light energy into the source power and supplies the same to the lever combination switch 10.

In this embodiment, the light source 22 is lighted by a signal processing circuit 24 when an ignition switch is turned ON.

Furthermore, an infrared ray emitting section 14 is provided on the movable section 200 and an infrared ray receiving section 26 is provided on the stationary section 100, respectively. A control signal from the lever combination switch 10 is delivered from the infrared ray emitting section 14 to the infrared ray receiving section 26 as a serial signal, and the infrared ray receiving section 26 converts the signal thus received into an electric signal and inputs the same into the signal processing circuit 24.

As described above, in this embodiment, the source power can be wirelessly supplied as the light energy from the electric circuit 20 provided on the side of the stationary section 100 to the lever combination switch 10 provided on the side of the movable section 200, and an output signal from the lever combination switch 10 can be wirelessly delivered to the electric circuit 20 as an infrared ray signal, so that the electric circuit provided on the side of the movable section 200 and the electric circuit provided on the side of the stationary section 100 can be completely divided into two blocks having no mechanically connecting portion therebetween.

As a result, according to the present invention, the movable section 200 can be easily assembled to the stationary section 100, and moreover, the members needed for supplying the source power and for delivering and receiving the signals can be highly simplified in construction.

Figure 2:
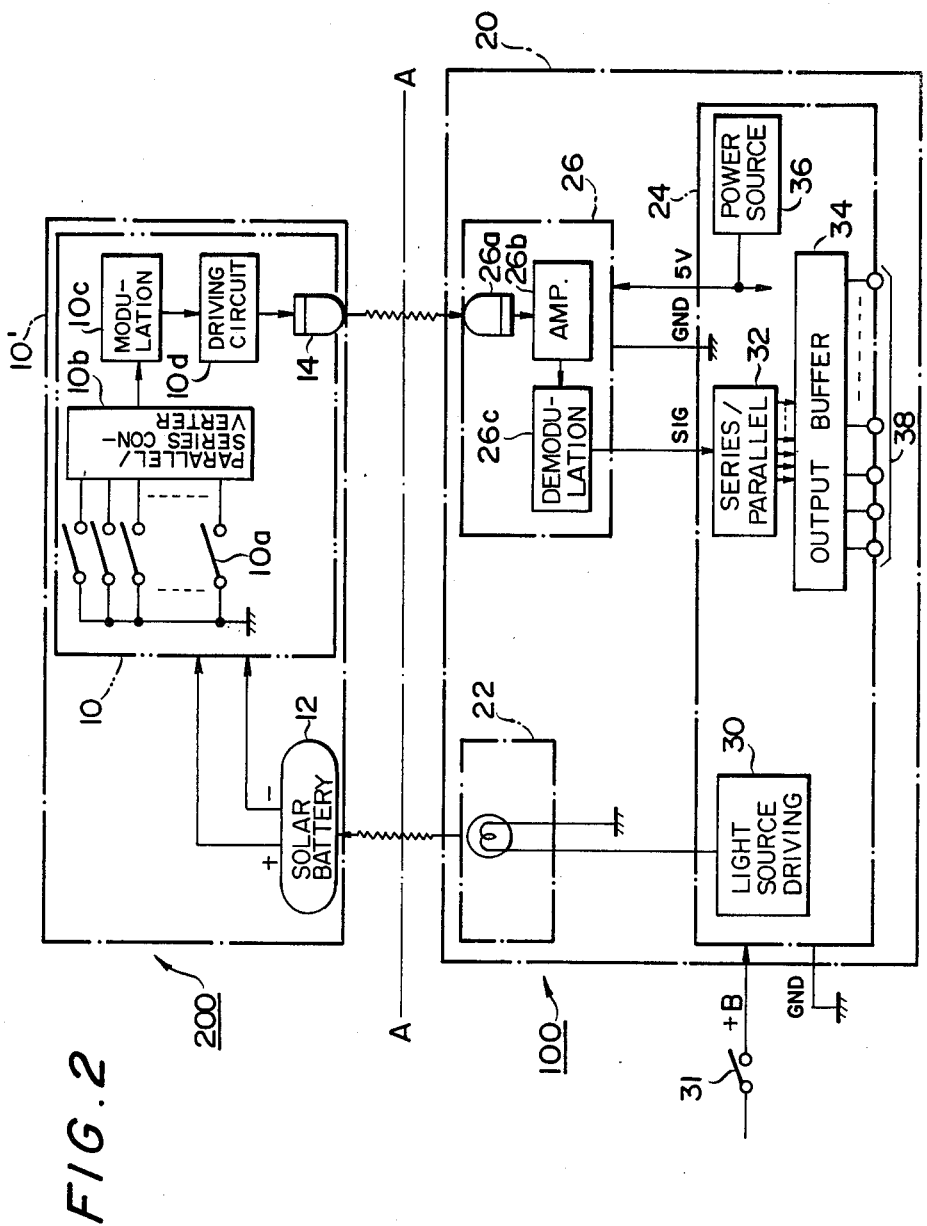
FIG. 2 is a specific electric circuit diagram of the embodiment shown in FIG. 1.

FIG. 2 shows the specific circuit arrangement of the device shown in FIG. 1. The electric circuit 20 provided on the side of the stationary section 100 in this embodiment includes the light source 22, the signal processing circuit 24 and the infrared ray receiving section 26 as described above, and an electric circuit 10' provided on the side of the movable section 200 includes the lever combination switch 10 and the solar battery 12 as described above.

In this embodiment, a light source driving section 30 is provided in the signal processing circuit 24 and constructed such that an ignition switch 31 is turned ON to light the light source 22, whereby the light energy is wirelessly supplied to the solar battery 12.

Here, the light source 22 suffices only if it can output a sufficient light energy, and it is desirable to use an incandescent lamp, laser, a high brightness LED or the like for example.

The light energy thus wirelessly supplied is converted into the source power in the solar battery 12 and outputted to the lever combination switch 10. Accordingly, in the device of this embodiment, the power consumption by the lever combination switch 10 provided on the side of the movable section 200 can be supplied by the output from the solar battery 12.

In the embodiment, this lever combination switch 10 has a plurality of control switches 10a including a wiper switch, a light control switch and the like, and output signals from the respective control switches are converted into serial signals through a parallel/series converter 10b, modulated in a modulation circuit 10c, thereafter, subjected to current amplification in a light emitting section driving circuit 10d, and light and drive the infrared ray emitting section 14.

As described above, a control signal from the lever combination switch 10 is wirelessly delivered to the infrared ray receiving section 26 on the side of the stationary section 100 as an infrared ray signal.

In the embodiment, the infrared ray receiving section 26 provided on the side of the stationary section 100 includes an infrared ray receiving element 26a for receiving an infrared ray signal delivered, an amplifier 26b for amplifying an output from the infrared ray receiving element 26a and a demodulator 26c for demodulating an output from the amplifier 26b, and the output signal therefrom is outputted to the signal processing circuit 24.

The signal processing circuit 24 converts the signal thus inputted into a parallel signal by a series/parallel converter 32, and outputs the same as a parallel signal 38 through an output buffer 34.

Additionally, the infrared ray receiving section 26 is driven by a voltage of 5 volts outputted from a power source circuit 36 provided in the signal processing circuit 24.

As described above, according to this embodiment, the source power for driving the lever combination switch 10 can be wirelessly supplied from the side of the stationary section 100 to the side of the movable section 200 as the light energy, and the signal outputted from the lever combination switch 10 can be wirelessly delivered to the side of the stationary section 100 as the infrared ray signal, so that it is understandable that the electric circuit 20 provided on the side of the stationary section 100 and the electric circuit 10' provided on the side of the movable section 200 can be completely divided into the two electric circuits having no mechanical connecting portion therebetween.

Furthermore, in the above embodiment, description has been given by exemplifying the case where the lever combination switch 10 is provided on the movable section 200, however, needless to say, even when a steering switch is provided on the movable section 200, similarly to the above, the source power can be supplied wirelessly, and moreover, an output from the steering switch can be wirelessly outputted to the side of the stationary section 100.

Figure 3:
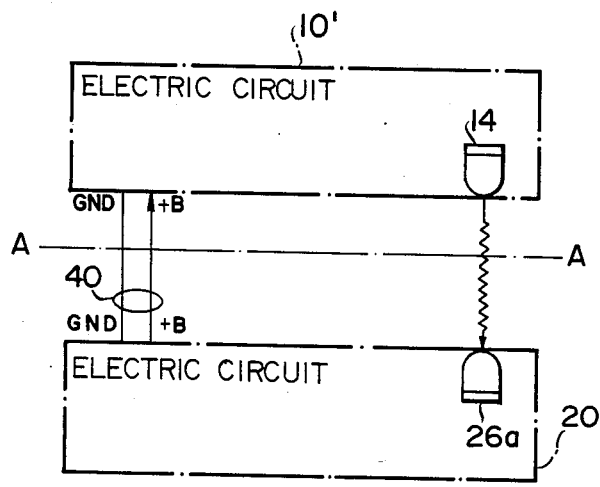
FIGS. 3 and 4 are explanatory views showing the conventional power source devices.

In contrast thereto, when the source power is supplied to the lever combination switch 10 by use of the conventional device as shown in FIG. 3 for example, the electric circuit 20 provided on the side of the stationary section 100 and the electric circuit 10' provided on the side of the movable section 200 are electrically connected to each other through a wire harness 40 for supplying the source power, and moreover, in order to adjust the wire harness 40 itself to the tilt or telescopic handle, it becomes necessary to form the wire harness 40 into a take-up reel type. Because of this, it is understandable that the conventional device has a low workability in assembling the movable section 200 to the stationary section 100 as compared with the device according to the present invention, is highly expensive, is rendered large-sized, and tends to have troubles and lacks reliability because the wire harness 40 is needed to be unwound from or wound into the reel.

Figure 4:
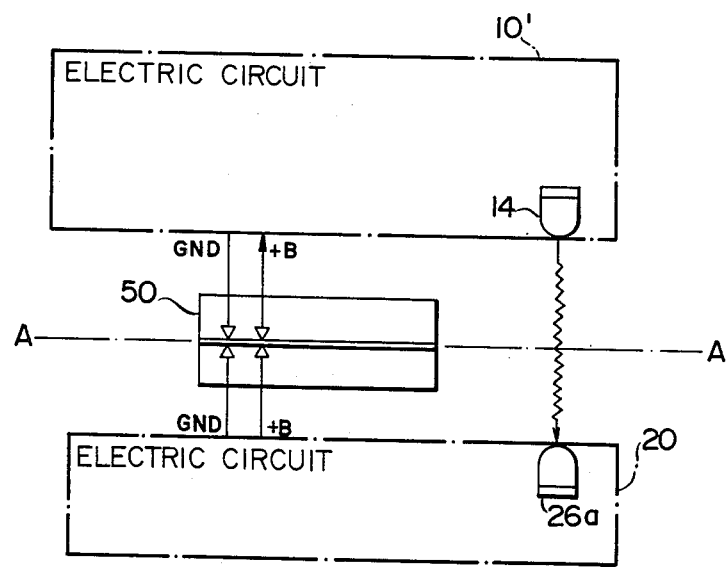

Furthermore, in order to supply the source power to the steering switch by use of the conventional device as shown in FIG. 4 for example, it is necessary to provide a slip ring 50 for supplying the source power on a rotary portion of the steering. Hence, it is understandable that, in this case, the workability in assembling the movable section 200 is low as compared with the workability according to the present invention, and moreover, the device as a whole comes to be expensive.

As described above, it is understandable that, according to the present invention, the device as a whole can be made simplified in construction and inexpensive as compared with the conventional power source device, and moreover, the workability in assembling the movable section 200 to the stationary section 100 can be highly improved.

Additionally, in the above embodiment, description has been made by exemplifying the case where the source power is wirelessly supplied from the stationary section 100 to the movable section 200 as the light energy, however, the present invention need not necessarily be limited to this, and the same effect as described above can be achieved even when such an arrangement may be adopted that thermal energy, electromagnetic energy, microwave or any other energy is wirelessly supplied in place of the aforesaid light energy.

Furthermore, in the above embodiment, the energy receiving section is adapted to receive only the energy from the energy supplying section provided on the first region, however, the present invention need not necessarily be limited to this, and the energy receiving section can be reformed to receive an external energy, and such an arrangement may be adopted that, for example, a plurality of solar batteries 12 shown in FIG. 1 are provided, any one of the solar batteries being arranged to receive the light other than the light source 22, and the remaining solar batteries are arranged to receive the sunlight supplied from the outside.

As has been described hereinabove, according to the present invention, the source power for driving an electric circuit can be wirelessly supplied from the first region, where the main power source is provided, to the electric circuit provided on the second region, movable relative to the first region, without using a wire harness or a slip ring.

What is claimed is:

1. A power source transmitting device for use in a motor vehicle and powered by a stationary power source on the vehicle, said power source transmitting device comprising:
   energy transmitting means disposed on a first stationary region of the motor vehicle for receiving power from the stationary power source and for wirelessly transmitting energy; and
   energy receiving means disposed on a second movable region of the motor vehicle for receiving the wirelessly transmitted energy and for converting the received energy into source power; and
   electric circuit means disposed on the second movable region of the motor vehicle for receiving the source power from said energy receiving means and for facilitating motor vehicle operations.

2. A power source transmitting device as in claim 1:
   said energy transmitting means comprising a light source; and
   said energy receiving means comprising a solar battery.

3. A power source transmitting device as in claim 2, said light source being an incandescent lamp.

4. A power source transmitting device as in claim 1:
   said energy transmitting means comprising an electromagnetic wave generator; and
   said energy receiving means comprising an electromagnetic wave receiver.

* * * * *